United States Patent [19]

Zammit

[11] 3,878,010
[45] Apr. 15, 1975

[54] APPARATUS AND METHOD FOR ADHESIVELY BONDING A ROOF COVERING TO AN AUTOMOTIVE VEHICLE ROOF

[75] Inventor: John A. Zammit, Grosse Ile, Mich.

[73] Assignee: General Motors Corporation, Detroit, Mich.

[22] Filed: Mar. 25, 1974

[21] Appl. No.: 454,098

[52] U.S. Cl. ............... 156/71; 156/285; 156/468; 156/475; 156/527; 156/538; 156/574; 264/90; 425/387; 425/388; 425/500
[51] Int. Cl. ............................................. E04f 13/00
[58] Field of Search ............ 156/71, 285, 468, 475, 156/527, 538, 574; 264/90, 92, 321; 425/387, 388, 500

[56] References Cited
UNITED STATES PATENTS

| | | | |
|---|---|---|---|
| 3,657,044 | 4/1972 | Singer | 156/475 |
| 3,818,823 | 6/1974 | Bond | 156/285 |

*Primary Examiner*—Edward G. Whitby
*Attorney, Agent, or Firm*—J. A. Kushman

[57] ABSTRACT

An apparatus and method for adhesively bonding a roof covering to an automotive vehicle roof utilizes a female mold to which a vacuum is supplied in order to hold the roof covering in the configuration of the roof as the covering is moved over the roof during the bonding operation. The female mold includes an apertured foam backed mat with integral projections that extend away from the mold in spaced relationship to each other so as to define the general contour of the roof and to also define a network of spacing between the projections. A vacuum plenum communicates with the apertures in the mat to draw a vacuum within the network of spacing which distributes the vacuum over the central portion of the roof covering. An outer groove about the periphery of the central portion of the mold receives an initial vacuum prior to the central portion so as to position the roof covering on the mold and to define a chamber between the roof covering and the central portion of the mold. The subsequent vacuum drawn in the central portion of the mold is transmitted to the chamber and rapidly draws the roof covering to the shape of the roof. In a modified embodiment, the periphery of the central portion of the mold defines inner and outer vacuum grooves about the central portion of the mold and an intermediate cutting slot located between the vacuum grooves. This cutting slot receives and guides a suitable cutting tool so that the roof covering is cut to the configuration of the roof. Guides on the mold slidably engage the roof so as to guide the attached roof covering downwardly onto the roof after first applying an adhesive to the covering and/or the roof. The mold is then pressurized between the roof covering and the mat so that the adhesive forms a bond between the roof and the roof covering.

7 Claims, 5 Drawing Figures

Fig. 1

PATENTED APR 15 1975　　　　　　　　　　　　　3,878,010

APPARATUS AND METHOD FOR ADHESIVELY BONDING A ROOF COVERING TO AN AUTOMOTIVE VEHICLE ROOF

BACKGROUND OF THE INVENTION

This invention relates generally to an apparatus and method for adhesively bonding a roof covering to an automotive vehicle roof.

In the recent past, sheets of vinyl have been adhesively bonded to automotive vehicle roofs in order to provide roof coverings with decorative appearances. This vinyl covering for the roof is generally referred to as a "vinyl top" and may include a foam padding that is bonded to the roof prior to the bonding of the vinyl. This foam pad gives the vinyl a plush appearance after it is installed and is generally utilized with the vinyl tops of luxury type automotive vehicles.

Heretofore, vinyl tops and foam pads therefor have been adhesively bonded to vehicle roofs by four workers, one at each corner of the roof. These workers hold a slightly oversized roof covering over the roof and manually move the roof covering downward so that an adhesive bonds the roof covering in position on the roof. The roof covering must then be pulled from its edges to eliminate wrinkles, manually rubbed to secure the adhesive bond thereof with the roof, and trimmed with a manual scissors to the proper size. Thus, this manual operation for adhesively bonding roof coverings to production vehicle roofs requires many man hours in order to provide a secure wrinkle-free bond between a roof and a roof covering of the proper size.

SUMMARY OF THE INVENTION

This invention provides an apparatus and method for adhesively bonding a roof covering to an automotive vehicle roof and utilizes a female mold that initially distributes a vacuum to hold the roof covering to the mold and subsequently applies a pressurized gas to the roof covering to secure an adhesive bond between the roof covering and the roof.

One feature of the invention is that the central portion of the female mold includes a mat that has projections extending away from the mold in spaced relationship to each other so as to define the general contour of the roof and to also define a network of spacing which evenly distributes the vacuum to initially secure the roof covering to the mold in the configuration of the vehicle roof, and the mold also applies a pressurized gas to the roof covering after it is placed over the roof so as to thereby secure an adhesive bond between the roof covering and the roof. Another feature of the invention is that a peripheral groove of the mold extends about the central portion thereof and receives an initial vacuum prior to the central portion so as to initially secure the roof covering in position and seal a chamber between the roof covering and the central portion of the mold so that the vacuum subsequently drawn in the network of spacing of the mat readily draws the roof covering into the configuration of the vehicle roof. Another feature of the invention is that a number of guides about the periphery of the female mold may also be utilized to guide the mold and the roof covering downwardly over the roof. Another feature of the invention is that a modified version of the female mold defines inner and outer vacuum grooves about the periphery of the central mold portion with an intermediate cutting slot located between the vacuum grooves, and the vacuum grooves position the roof covering so that the cutting slot may receive and guide a suitable cutting tool that cuts the edge of the roof covering to the configuration required.

BRIEF DESCRIPTION OF THE DRAWINGS

The above-specified features and other features, objects and advantages of the apparatus and method of this invention are readily understood from the following detailed description of the preferred embodiments and the drawings in which.

DETAILED DESCRIPTION OF THE PREFERRED EMBODIMENTS

Figure 1:
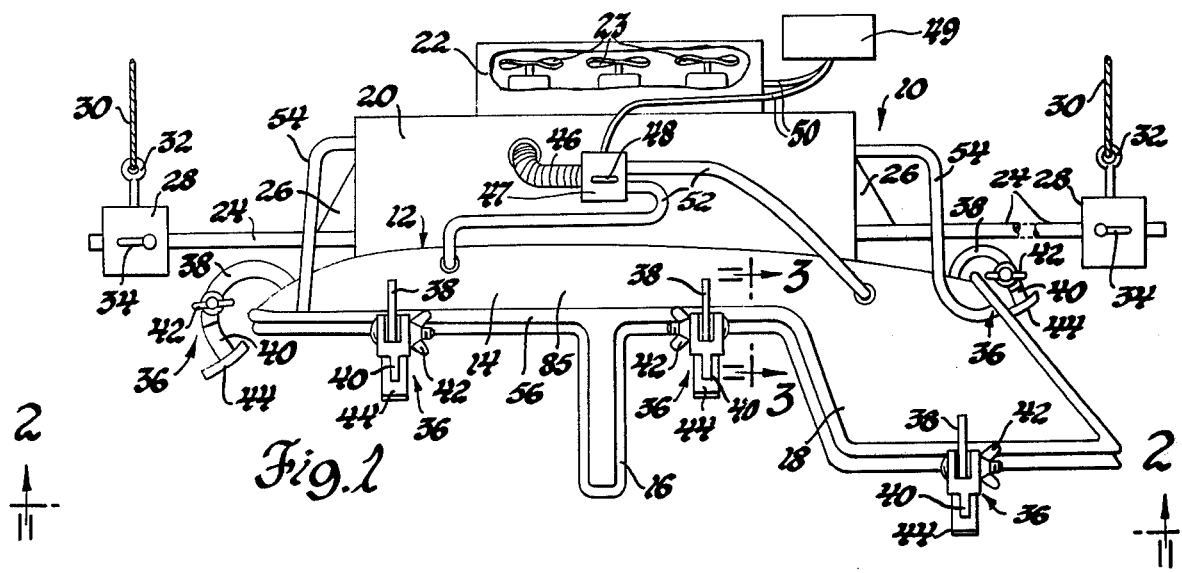
FIG. 1 is a side view of an apparatus that is constructed according to, and used in accordance with the method of this invention so as to adhesively bond a roof covering to an automotive vehicle roof.

Referring generally to FIG. 1, an apparatus constructed according to, and used in accordance with the method of, this invention is generally indicated by numeral 10. The apparatus includes a female mold 12 whose lower side generally conforms to the configuration of a vehicle roof with which the apparatus is utilized in order to adhesively bond a roof covering on the roof. The female mold includes a central roof portion 14, side door pillar portions 16, and sail panel portions 18 adjacent the rear end of the roof configuration.

An elongated rectangular plenum 20 is mounted on the central portion 14 of the apparatus extending longitudinally of the roof configuration. A fan housing 22 of an elongated rectangular configuration is mounted on top of plenum 20 and encloses three motor driven suction fans 23 that draw a vacuum within the plenum. An elongated support rod 24 extends longitudinally through the plenum 20 and is fixedly secured to each end thereof by way of triangular plates 26 suitably secured in position such as by welding. The ends of support rod 24 are respectively received by a pair of journal supports 28 that are suspended from cables 30 by way of eyelet members 32. Manual handles 34 of the journal supports are selectively actuated to operate suitable detent mechanisms, not shown, within the journal supports so as to detent the support rod either in the position shown in FIG. 1 or in a position where the female mold 12 of the apparatus is upside-down and opens upwardly. The apparatus is detented in its upside-down position to initially secure the roof covering, such as a sheet of vinyl or a foam pad for such a sheet of vinyl. After a vacuum is applied to the roof covering, in a manner that will be subsequently described, rotatably movement of the apparatus to its right-side-up position as shown in FIG. 1 then allows movement of a carrier that secures cables 30 to position the roof covering over a vehicle roof. Subsequently, the cables 30 lower the female mold 12 in a suitable manner so as to receive the vehicle roof with an adhesive between the roof covering and the roof in order to bond the roof covering in position. Of course, it is understood that this apparatus 10 may be moved in any suitable manner in order to move the roof covering over the roof.

The periphery of the female mold 12 supports a plurality of guides 36 that are used to guide the mold 12 downwardly over a roof to which the roof covering carried by the mold is to be applied. These guides include fixed members 38 secured to the mold and having arcuately curved configurations with their free ends pivotally supporting arcuately curved movable members 40. Wing nuts 42 at the juncture of the fixed and movable members of the clamps are operable to position shoes 44 secured to the free ends of the movable members in non-guiding or guiding positions. In the non-guiding positions, the shoes 44 are positioned outside of the mold periphery to allow free access to the mold during the initial placement of the roof covering on the upside-down mold. These shoes are movable to the guiding positions, FIG. 3, to slidably engage the roof periphery and to thereby guide the mold downwardly as it carries the roof covering into engagement with the roof, the roof covering being shown by phantom line representation in this view and indicated by 45. The positioning of the guides in either position and movement therebetween is thus accomplished by tightening and loosening of wing nuts 42. However, it should be noted that the guides 36 may position the shoes 44 in other manners, such as by toggle action that provides an overcenter locking of the shoes in the guiding position.

As seen in FIG. 1, a conduit 46 communicates plenum 20 with a valve 47 mounted on the side of the plenum that is shown. The other side of the plenum has a like conduit and valve, and these valves are interconnected to a common handle 48 on the shown valve 47 for movement between three positions. A remote air compressor 48 is also communicated to valves 47 by suitable flexible conduits 50. Conduits 52 are likewise connected to valves 47 and also to the female mold 12 in a manner that will be described later. One position of valve handle 48 positions valves 47 to communicate a vacuum in plenum 20 with mold 12 via conduit 46 and conduits 52. A second position of handle 48 positions valves 47 to communicate the air compressor 49 with the mold 12 via conduits 50 and conduits 52. The third position of handle 48 causes valves 47 to isolate the conduits 52 from both the plenum 20 and the air compressor 49. A pair of front and rear conduits 54 on each side of mold 12 communicate the plenum 20 with a conduit 56 that extends about the periphery of the central portion of the mold, down over the side pillar portions 16, and about the sail panel portions 18. These conduits 54 do not pass through the valves 47 and thus constantly draw a vacuum in conduit 56 whenever a vacuum is present in the plenum 20 regardless of the position of valve handle 48.

Figure 2:
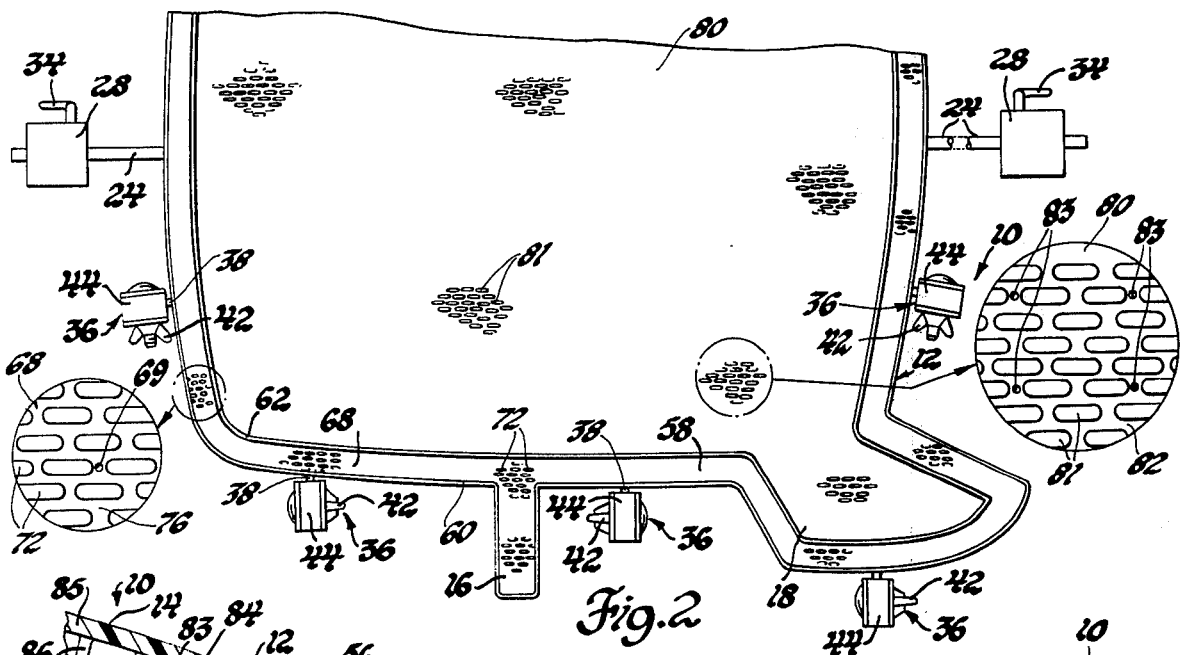
FIG. 2 is a bottom plan view of the apparatus taken generally along line 2—2 of FIG. 1 and shows a mat thereof which defines a network of spacing that distributes a vacuum so that the roof covering is uniformly secured thereto for movement over the roof during the bonding operation, and phantom line encircled portions of this view are shown connected by arrows to solid line encircled portions that show enlargements of these portions.
Figures 3, 4, 5:
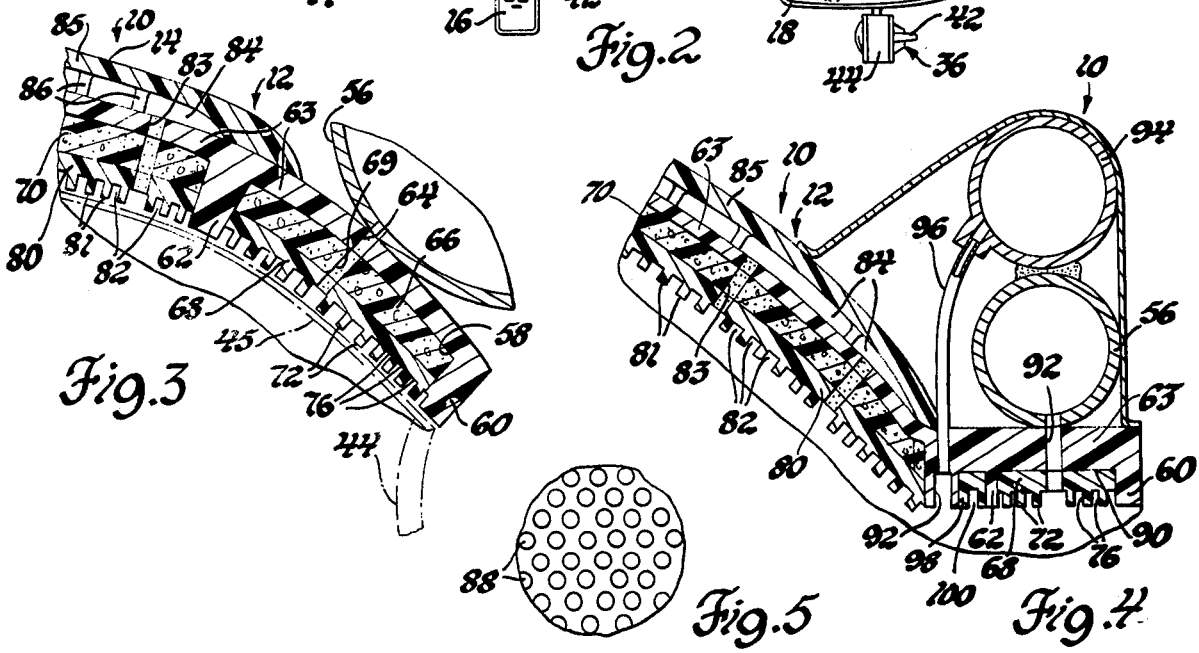
FIG. 3 is a sectional view through the outer edge of the apparatus taken generally along line 3—3 of FIG. 1 and shows an outer groove of the apparatus in which a vacuum is initially drawn in order to position the edge of the roof covering.
FIG. 4 is a sectional view, taken in a manner similar to FIG. 3, of a modified embodiment of the apparatus which includes a pair of the outer vacuum grooves for positioning the edge of the roof covering with a cutting slot therebetween that receives and guides a cutting tool for cutting the roof covering to the configuration required.
FIG. 5 is a view which shows a mat configuration which may be used within the central portion of the apparatus to distribute the vacuum.

Additional reference to the cross-sectional view of FIG. 3 shows that conduit 56 extends alongside a groove 58 defined on the lower side of mold 12 at the outer periphery of the mold. The outer and inner sides of this groove are respectively defined by integral ribs 60 and 62 that extend from a base wall 63 of the mold. A number of apertures 64 are defined along the periphery of the mold, one of which is seen in FIG. 3, and extend through the conduit 56 and mold wall 63 so as to communicate the vacuum in the conduit with the groove 58. This groove also receives a strip of foam 66 that is covered by a strip of rubber mat 68, and these components are likewise apertured at 69 in alignment with aperture 64 to communicate the vacuum to the lower side of mold 12 at the outer mold edge. Integral projections 72 of the mat strip 68 within groove 58 engage the roof covering 45 as it is placed over the female mold 12 with the apparatus 10 in the upside-down position. These projections also define an interconnected network of spacing 76 that is seen best in the enlarged portion of FIG. 2. This network of spacing communicates the vacuum drawn through apertures 69 over the whole lower extend of mat strip 68.

The central portion 14 of female mold 12 receives a foam pad 70, as seen in FIG. 3, that resiliently supports a rubber mat 80. This mat includes integral projections 81 that define an interconnected network of spacing 82 over the whole lower side of the central portion of the mold 12. The mat 80, the foam pad 70, and the base wall 63 define aligned apertures 83 at spaced intervals over the extent of the central portion of the mold. These apertures communicate the interconnected network of spacing 82 defined by mat 80 with a secondary plenum 84 on the upper side of the base wall 63 of the female mold. This secondary plenum is defined by the mold base wall 63 and a cooperably upper plenum member 85 that is suitably secured to the base wall. A number of spaced lugs 86 of the plenum member 85 engage the base wall to maintain a spaced relationship between these components. The plenum 84 is communicated with the lower ends of conduits 52 so that a vacuum within these conduits is drawn within the network of spacing 82 defined by mat 80. This vacuum is thus evenly distributed over the whole extent of this mat.

It should be noted that the integral projections 72 and 81 of these mats 68 and 80, respectively, may have different configurations. The configuration these projections have as shown in FIGS. 2 and 3 is elongated with rounded ends in a somewhat oblong configuration. This type of configuration can be readily obtained by purchasing the type of material used to make conveyor belts and all that must be done is to merely form the apertures in the mat material. However, it should be noted that other types of configurations for the integral projections of the mat are possible. For example, the mat may have projections with circular cross sections as shown by the projections 88 in FIG. 5. The projections must be in spaced relationship with respect to each other, however, in order that the vacuum which is received by the network of spacing between the projections will be communicated over the total extent of the mat. Also, the mat projections should be close enough to each other to support the roof covering 45 in a generally planar configuration when the vacuum is drawn within the networks of spacings defined by the mats. Nevertheless, the mat projections should be far enough away from each other so that the vacuum drawn is readily distributed. Both the flexibility of the roof covering and the magnitude of the vacuum drawn between the mat projections thus determine the proper spacing of these projections; however, this spacing can vary to some degree and still have the apparatus function effectively.

The roof covering 45 is secured to the female mold 12 of this apparatus 10 by first positioning the apparatus in its upside-down position with the guide shoes 44 in their non-guiding position as shown in FIG. 2, and the valve handle 48 is positioned to isolate conduits 52 and hence mold 12 from both the vacuum plenum 20 and the air compressor 49. The roof covering is then placed over the mold so as to generally be in alignment with the roof configuration. The suction fans 23 are then energized by a suitable electric circuit, and the consequent vacuum in plenum 20 is drawn in conduit 56 through conduits 54. Thus a vacuum is consequently drawn within the outer groove of the mold, but it is not drawn within the central mold portion due to the position of valves 47. This vacuum is distributed within the network of spacing defined by the mat 68 in this outer groove and seals the roof covering 45 to the ribs 60 and 62 that define the outer and inner edges of the groove. This sealing causes a chamber to be formed between the roof covering 45 and the central portion of the mold.

Preferably, for a reason which will be subsequently explained, the securement of the edge of the roof covering 45 by the vacuum drawn in the outer mold groove 58 will maintain the central portion of the roof covering in a taut condition. This is accomplished by two workers pulling opposed edges of the roof covering adjacent the periphery of mold 12. Due to the normal curvature of the roof configuration and the more planar configuration of the taut roof covering, a sealed chamber is formed between the roof covering and the central portion of the mold. The valve handle 48 is then moved to position valves 47 so the vacuum in plenum 20 is communicated with the mold 12 via conduits 46 and 52. A vacuum is thereby drawn within the secondary plenum 84 over the central portion of the mold 12, and the apertures 83 through the mold communicate this vacuum to the chamber defined between the mold and the roof covering. The roof covering is thereby drawn into engagement with the free ends of mat projections 81 so as to define the configuration of the roof to which it is to be bonded. The network of spacing 82 between these mat projections 81 distributes the vacuum over the whole extent of the extent of the central portion of the roof covering to evenly secure the roof covering in position. Due to the prior taut condition of the roof covering, it is highly tensioned with the vacuum applied to its central portion.

An adhesive is then applied to the roof and/or the roof covering in order to provide an adhesive bond as the apparatus 10 is subsequently turned right-side-up and moved downwardly over the roof with the guide shoes 44 guiding its movement. After the mold 12 has settled onto the roof, the electric motors of suction fans 23 are de-energized to thereby terminate the vacuum to the central portion of the mold so that the central portion of the roof covering is free of this vacuum. The tensioned condition of the roof covering then causes it to rapidly move to its prior taut condition and to engage the roof in a wrinkle-free manner as the adhesive bonds the covering to the roof.

The valve handle 48 is then moved so that valves 47 communicate conduits 50 with conduits 52 and operation of air compressor 49 then pressurizes the secondary plenum 84, FIG. 3, on female mold 12 and this pressure buildup is transmitted to below the mold by the apertures 83. With the weight of the apparatus 10 maintaining a generally sealed condition between the roof covering 45 and the periphery of the mold 12, the upper side of the roof covering is thus subjected to a pressure which ensures that the adhesive will provide a bond between the roof covering 45 and the roof. This is accomplished in a uniform manner due to the distribution of the pressurized air over the whole extent of the roof covering. The pressurized air will be located between the free ends of the mat projections 81 and the roof covering since the air then pushes the roof covering away from the mold 12. After this pressurization has proceeded for a sufficient period of time, the air compressor is de-energized and apparatus 10 is then moved upwardly while the roof covering 45 remains in position on the roof. After manual trimming of the edge of the roof covering, the bonding operation is completed and the apparatus is ready for another cycle.

It should be noted that the distance between the sail panels of production vehicles manufactured on an assembly line can vary to some degree. Thus, to ensure that the female mold 12 of the apparatus can be moved downwardly over all vehicle roofs with which it is to be used, the distance between the sail panel portions 18 of the mold must be slightly larger than the largest corresponding distance of the vehicle roofs. This stricture must also be followed with the side pillar portions 16 of the mold 12.

FIG. 4 shows a modified embodiment of the female mold 12 in which similar components are identified by like numerals. However, the outer portion of this modified embodiment has two peripheral grooves, an outer groove 90 and an inner groove 92. The outer groove 90 does not receive the foam pad 66 utilized by the embodiment shown in FIG. 3 but rather has the strip of mat 68 directly engaging the base wall 63 of the mold between the outer and inner ribs 60 and 62. A number of apertures 92 all the way through the strip of mat 68 and the mold wall 63 communicate the conduit 56 with the network of spacing 76 formed between the projections 72 of the mat. A conduit 94 suitably supported on top of conduit 56 communicates a vacuum from the suction fans of the apparatus to the inner groove 92 by way of a number of conduits 96 along the length of the edge of the female mold. Between these outer and inner vacuum grooves 90 and 92, the female mold fixedly mounts an elongated U-shaped member 98 which defines a cutting slot 100.

The conduits 56 and 94 of this modified embodiment shown in FIG. 4 are connected to one or more valves similar to valves 47 in a manner which first supplies a vacuum to both of these conduits as the roof covering is initially placed over the up-side-down female mold of the apparatus. The edge of the roof covering is then held by a vacuum that is drawn within both the outer and inner vacuum grooves 90 and 92 by suitable valving and conduits communicated with the plenum where the suction fans 23 draw the vacuum. The central portion of the roof covering is drawn toward the central portion of the mold by a vacuum that is subsequently drawn in the central portion 14 of the mold in the same manner as the embodiment previously described so as to secure the roof covering in position on the mold. A suitable cutting tool, either manual or power operated, is then received and guided by the cutting slot 100 to cut the roof covering to the configuration required by the contour of the vehicle roof to which the covering is to be applied. The valve or valves of conduits 56 and 94 then allows the vacuum to be terminated within conduit 56 so that the excess roof covering material may be removed from the apparatus prior to the bonding operation. The inner vacuum groove 92 then maintains the small strip of roof covering outside of the central portion of the mold in position during the bonding operation as the apparatus 10 is placed over a vehicle roof.

It should, of course, be appreciated that the projections defining the networks of spacing for distributing the vacuum do not necessarily have to be formed as integral projections of the foam backed mats; rather, they may be formed of separate projections suitably secured to the mold in a manner that distributes the vacuum and forms the free ends of the projections in the roof configuration. However, by having the projections formed by integral portions of the mats, an economical structure results. Also by having the mat at the central portion of the mold supported by foam, the resiliency present accommodates irregularities in the roof.

It is believed evident from the foregoing description that this invention provides an improved and efficient manner of adhesively bonding a roof covering to an automotive vehicle roof.

What is claimed is:

1. An apparatus for adhesively bonding a roof covering to an automotive vehicle roof, the apparatus comprising:
   a female mold substantially conforming to the shape of a vehicle roof to which the roof covering is to be bonded;
   a mat received by the mold and having projections extending away from the mold in spaced relationship to each other so as to define the general contour of the roof and to also define a network of spacing therebetween, the mat also defining a plurality of spaced apertures therethrough in communication with the network of spacing defined by the projections;
   suction means for drawing a vacuum at the apertures in the mats to thereby also draw a vacuum in the network of spacing between the projections thereof so as to secure the roof covering to the mold in the configuration of the roof, the secured roof covering being placed over the roof by movement of the mold so that an adhesive between the roof and the roof covering provides a bond therebetween; and
   means for supplying a pressurized gas to the roof covering through the apertures in the mat to thereby pressurize the bond and ensure adhesive bonding of the roof covering to the roof.

2. An apparatus for adhesively bonding a roof covering to an automotive vehicle roof, the apparatus comprising:
   a female mold having a central portion substantially conforming to the shape of a vehicle roof to which the roof covering is to be bonded and also defining an outer groove about the pheriphery of the central portion;
   a mat received by the central portion of the mold and having integral projections extending away from the mold in spaced relationship to each other so as to define the general contour of the roof and to also define a network fo spacing therebetween;
   valved suction means for drawing a vacuum in the peripheral groove defined by the mold and in the network of spacing defined by the mat, this valved suction means being adapted to first draw the vacuum in the groove so the roof covering may be placed over the mold and initially secured thereto to allow the vacuum to be subsequently drawn within the network of spacing defined by the mat in a manner that secures the central portion of the roof covering to the mold in the configuration of the roof, and the secured roof covering being placed over the roof by movement of the mold so that an adhesive between the roof and the roof covering provides a bond therebetween; and
   means for supplying a pressurized gas to the central portion of the mold between the roof covering and the mat so as to pressurize the bond and ensure adhesive bonding of the roof covering to the roof.

3. An apparatus for adhesively bonding a roof covering to an automotive vehicle roof, the apparatus comprising:
   a female mold having a central portion substantially conforming to the shape of a vehicle roof to which the roof covering is to be bonded and also defining an outer groove about the periphery of the central portion;
   a mat received by the central portion of the mold and having integral projections extending away from the mold in spaced relationship to each other so as to define the general contour of the roof and to also define a network of spacing therebetween;
   a plurality of guide shoes mounted on the mold for movement between now guiding positions where the mold is accessible to position the roof covering thereon and guiding positions where the shoes engage the roof as the mold is moved downwardly over the roof;
   valved suction means for drawing a vacuum in the peripheral groove of the mold and in the network of spacing defined by the mat, this valved suction means being adapted to first draw the vacuum in the groove so as to secure the edge of the roof covering to the mold and to also seal the edge of the roof covering to the mold in a manner that defines an enclosed chamber between the mat and the roof covering, the valved suction means subsequently drawing a vacuum within the network of spacing defined by the mat so as to thereby also draw a vacuum in the sealed chamber between the roof covering and the mat in a manner that secures the central portion of the roof covering to the mold in the configuration of the roof, and the secured roof covering being placed over the roof by movement of the mold so that an adhesive between the roof and the roof covering provides a bond therebetween; and
   an air compressor for supplying pressurized air to the central portion of the mold between the roof covering and the mat so as to pressurize the bond and ensure adhesive bonding of the roof covering to the roof.

4. An apparatus for adhesively bonding a roof covering to an automotive vehicle roof, the apparatus comprising:
   a female mold having a central portion substantially conforming to the shape of a vehicle roof to which the roof covering is to be bonded and also defining inner and outer vacuum grooves about the periphery of the central portion and an intermediate cutting slot located between the vacuum grooves;
   a mat received by the central portion of the mold and having integral projections extending away from the mold in spaced relationship to each other so as to define the general contour of the roof and to also define a network of spacing therebetween; and
   valved suction means for drawing a vacuum in the inner and outer vacuum grooves defined by the mold and in the network of spacing defined by the mat, this valved suction means being adapted to first draw the vacuum in the inner and outer vacuum grooves so the roof covering may be placed over the mold and initially secured thereto by sealing the edge of the roof covering to the mold along these vacuum grooves and thereby defining a chamber between the roof covering and the central portion of the mold, the valved suction means subsequently drawing a vacuum within the network of spacing defined by the mat so as to thereby also draw a vacuum in the sealed chamber between the roof covering and the mat in a manner that secures the central portion of the roof covering to the mold in the configuration of the roof, the cutting slot of the mold being adapted to receive and guide a suitable cutting tool so as to cut the secured edge of the roof covering to the configuration required, and the secured roof covering being placed over the roof by movement of the mold so that an adhesive between the roof and the roof covering provides a bond therebetween; and
   an air compressor for supplying pressurized air to the central portion of the mold between the roof covering and the mat so as to pressurize the bond and ensure adhesive bonding of the roof covering to the roof.

5. A method for adhesively bonding a roof covering to an automotive vehicle roof, the method comprising:
   placing the roof covering over a female mold of the roof having a central portion with a mat including projections extending away from the mold in spaced relationship to each other so as to define the general contour of the roof and to also define a network of spacing therebetween;
   drawing a vacuum within the network of spacing defined by the mat so as to draw the roof covering into engagement with the projections and thereby secure the roof covering to the mold;
   moving the mold with the roof covering secured thereto so as to position the roof covering over the vehicle roof with an adhesive therebetween; and
   pressurizing the mold between the roof covering and the mat to pressurize the roof covering and ensure adhesive bonding thereof to the roof.

6. A method for adhesively bonding a roof covering to an automotive vehicle roof, the method comprising:
   placing the roof covering over a female mold of the roof having a groove about the periphery thereof and a central portion including a mat with integral projections extending away from the mold in spaced relationship to each other so as to define the general contour of the roof and to also define a network of spacing therebetween;
   drawing a vacuum within the groove to secure the edge of the roof covering to the mold and to also seal a chamber between the roof covering and the central portion of the mold;
   drawing a vacuum within the network of spacing defined by the mat so as to also draw a vacuum within the sealed chamber and thereby pull the roof covering into engagement with the projections of the mat in a manner that secures the roof covering to the mold;
   moving the mold with the roof covering secured thereto so as to position the roof covering over the vehicle roof with an adhesive therebetween; and
   pressurizing the mold between the roof covering and the mat to pressurize the roof covering and ensure adhesive bonding thereof to the roof.

7. A method for adhesively bonding a roof covering to an automotive vehicle roof, the method comprising:
   placing the roof covering over a female mold of the roof having a pair of spaced vacuum grooves about the periphery thereof with a cutting slot between the vacuum grooves and with a central portion of the mold having a mat including integral projections extending away from the mold in spaced relationship to each other so as to define the general contour of the roof and to also define a network of spacing therebetween;
   drawing a vacuum within the vacuum grooves to secure the edge of the roof covering to the mold and to also seal a chamber between the roof covering and the central portion of the mold;
   drawing a vacuum within the network of spacing defined by the mat so as to also draw a vacuum within the sealed chamber and thereby pull the roof covering into engagement with the projections of the mat in a manner that secures the roof covering to the mold;
   guiding a cutting tool along the cutting slot of the mold with the roof covering secured thereto so as to trim the secured edge of the roof covering to the configuration required;
   moving the mold with the roof covering secured thereto so as to position the roof covering over the vehicle roof with an adhesive therebetween in a manner that provides an adhesive bond holding the roof covering in position on the roof; and
   pressurizing the mold with pressurized air between the roof covering and the mat to pressurize the roof covering and ensure adhesive bonding thereof to the roof.

* * * * *